United States Patent [19]
Koltoniak

[11] Patent Number: 5,893,230
[45] Date of Patent: Apr. 13, 1999

[54] RETRIEVAL SYSTEM FOR DUCK DECOYS

[76] Inventor: Jerry Koltoniak, 4357 W. Rauch Rd., Petersburg, Mich. 49270

[21] Appl. No.: 08/900,623

[22] Filed: Jul. 25, 1997

[51] Int. Cl.$^6$ .................................................. A01M 31/06
[52] U.S. Cl. ........................................................... 43/3
[58] Field of Search ....................................... 43/2, 3

[56] References Cited

U.S. PATENT DOCUMENTS

| | | | |
|---|---|---|---|
| 2,747,814 | 5/1956 | Taylor | 43/3 X |
| 3,909,970 | 10/1975 | McGregor | 43/3 |
| 4,056,890 | 11/1977 | Dembski | 43/3 |
| 4,340,192 | 7/1982 | Burris, III | 43/3 X |
| 4,757,630 | 7/1988 | Torberg | 43/3 |
| 4,826,099 | 5/1989 | Johnson | 43/3 X |
| 4,827,653 | 5/1989 | Sewell | 43/3 |
| 4,935,585 | 6/1990 | Eckhaus | |
| 5,367,813 | 11/1994 | Cherry | 43/2 |
| 5,562,260 | 10/1996 | Salvador et al. | 242/397.1 |

*Primary Examiner*—Robert P. Swiatek
*Attorney, Agent, or Firm*—MacMillan, Sobanski & Todd, LLC

[57] ABSTRACT

A retrieval system for a duck decoy. The retrieval system comprises a bi-directional motor having an output shaft, a housing and a T-shaped member disposed within the housing and attached to the output shaft. The rotation of the motor causes the T-shaped member to engage a post on the reel causing the reel to rotate in the same direction as the motor and T-shaped member. In this manner, the retrieval system is capable of winding the decoy cord to raise the anchor of the duck decoy. The speed of rotation of the T-shaped member can be controlled by the user.

11 Claims, 1 Drawing Sheet

RETRIEVAL SYSTEM FOR DUCK DECOYS

BACKGROUND OF THE INVENTION

1. Field of the Invention

The invention relates in general to duck decoys, and in particular to a retrieval system that allows the hunter to automatically wind the decoy cord to raise an anchor on a duck decoy.

2. Related Art

In the popular sport of duck hunting, the use of duck decoys is quite common. Oftentimes, numerous duck decoys are deployed by the hunters, sometimes as many as a hundred decoys may be set up by the hunters. In most circumstances, the hunters must set out and retrieve their decoys each day they hunt. It is also possible that while hunting the hunters may want to relocate their decoys due to changing weather conditions or to a location of more desirable duck activity.

Typically, each duck decoy is held in place using an anchor attached to a cord on a reel located underneath the decoy. The reel usually has a winding mechanism that allows the hunter to manually wind the anchor. Because of the number of duck decoys that are deployed by the hunter, the task to wind the anchor becomes very tedious and time-consuming.

Many conventional devices are known in the art that automatically wind the reel of the duck decoy. However, these conventional devices are unreliable because of their complex design, making them unduly complicated.

SUMMARY OF THE INVENTION

It is an object of the invention to provide a retrieval system that winds a reel mechanism of a duck decoy.

It is another object of the invention to provide an apparatus that automatically winds an anchor for a duck decoy.

To achieve these and other objects of the invention, a retrieval system for a duck decoy comprises a motor having an output shaft, a housing removably attached to a reel of the duck decoy, and a T-shaped member drivingly connected to the output shaft of the motor and rotatably connected to the housing. The T-shaped member engages the reel of the duck decoy such that rotation of the motor causes rotation of the reel.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
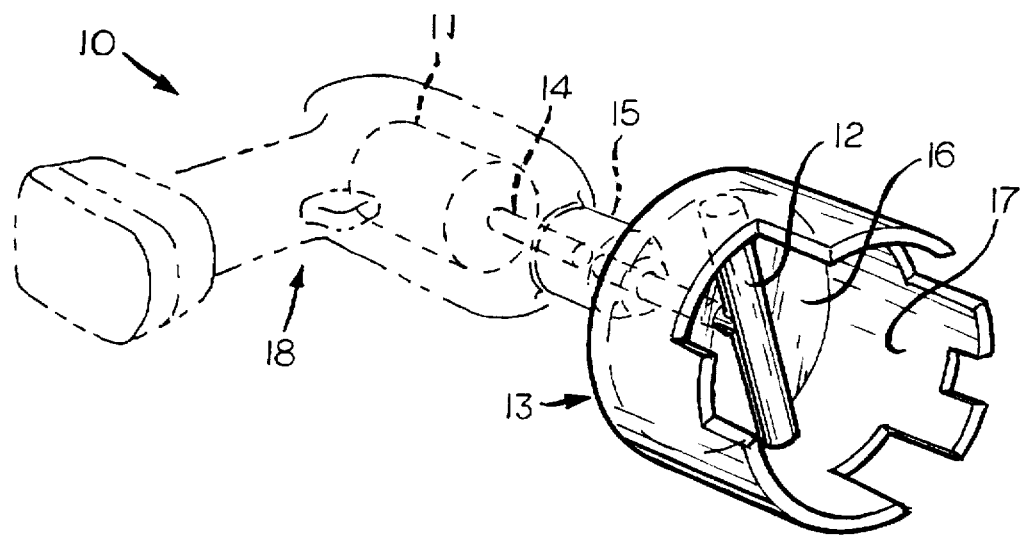
FIG. 1 shows a perspective view of the retrieval system for a duck decoy according to a preferred embodiment of the invention.
Figure 2:
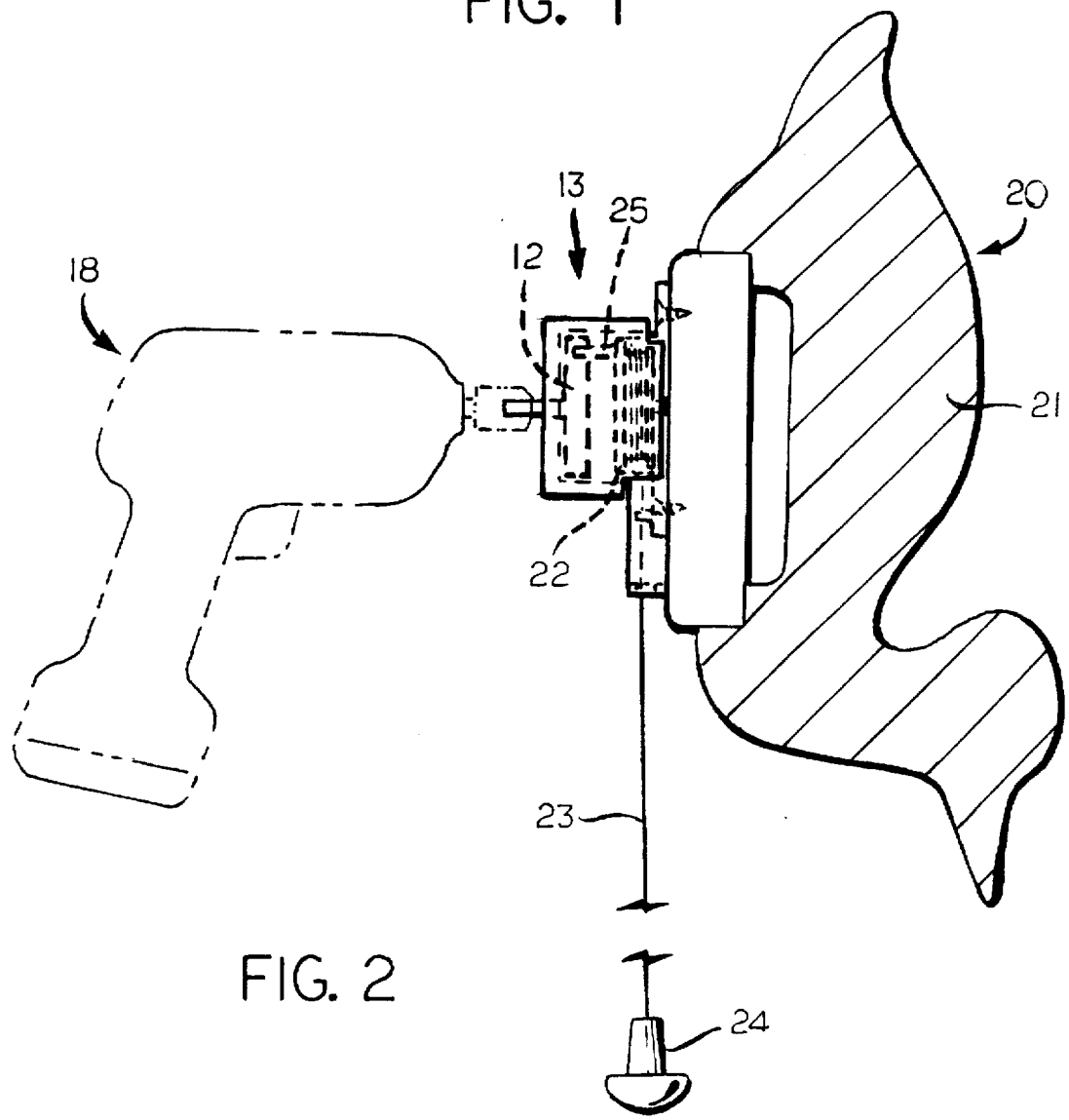
FIG. 2 shows a cross-sectional side view of the retrieval system according to the preferred embodiment of the invention.

FIGS. 1 and 2 show a retrieval system 10 for a duck decoy according to a preferred embodiment of the invention.

The retrieval system 10 comprises a motor 11, a T-shaped member 12 and a housing 13. The duck decoy 20 typically comprises a duck 21 made of lightweight material and a reel 22 rotatably mounted to the underside of the duck 21. The reel 22 includes a decoy cord 23 and an anchor 24 attached to the end of the decoy cord 23. It should be understood that rotating reel 22 causes the decoy cord 23 to wind onto the reel 22 and raises the anchor 24. A post 25 is usually connected to the reel 22 to allow the hunter to manually rotate the reel 22 to wind the decoy cord 23 from the reel 22.

In the preferred embodiment, the motor 11 is a variable-speed, bi-directional motor of a type well-known in the art and typically includes an output shaft 14. In the preferred embodiment, the motor 11 and output shaft 14 may be housed in a portable drill 18 having a chuck 15. A chuck 15 may be used to connect the output shaft 14 of the motor 11 to the stem of the T-shaped member 12. T-shaped member 12 is preferably made of a single piece of hard, durable material, such as steel and the like. It should be appreciated that once the T-shaped member 12 is connected to the output shaft 14 using chuck 15, rotation of the output shaft 14 by motor 11 causes rotation of the T-shaped member 12. It should also be understood that the invention is not limited by a particular type of motor and that other means for rotating the T-shaped member can also be used with the invention.

In the preferred embodiment, housing 13 is generally cylindrical in shape and includes a base 16 and side walls 17. Preferably, housing 13 is made of a single piece of lightweight, durable material that can be molded or extruded, such as plastic and the like. The stem of the T-shaped member 12 is rotatably connected to the base 16 using washers and the like. The side walls 17 are formed such that the housing 12 can be removably attached to the reel 22. It should be understood that the invention is not limited to shape of the housing 13 of the preferred embodiment, and that the housing 13 may be any desirable shape in order to be removably attached to a particular shape of the reel.

Once the housing 13 is removably attached to the reel 22, rotation of the motor 11 causes rotation of the T-shaped member 12. The head or cross-bar of the T-shaped member 12 engages the post 25 that is fixedly connected to the reel 22, thereby causing the reel 22 to rotate in the same direction as the motor 11 and T-shaped member 12. As a result, the decoy cord 23 automatically winds onto the reel 22 and raises the anchor 24.

In summary, the invention provides a device for automatically winding the decoy cord and anchor for a duck decoy. The invention also provides a less-complicated and more reliable apparatus than conventional devices and alleviates the burdensome task of winding the decoy cord to raise the anchor on the duck decoy.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A retrieval system, in combination with a duck decoy, the system comprising:

a motor having an output shaft;

a housing removably attached to a reel of the duck decoy; and a T-shaped member drivingly connected to the output shaft of said motor and rotatably connected to said housing, said T-shaped member engaging the reel of the duck decoy such that rotation of the motor causes rotation of the reel.

2. The retrieval system according to claim 1, wherein said housing is cylindrical in shape and comprises a base and side walls.

3. The retrieval system according to claim 2, wherein said T-shaped member is rotatably connected to the base of said housing.

4. The retrieval system according to claim 1, wherein said motor comprises a bi-directional motor.

5. An apparatus, in combination with a duck decoy, for automatically raising an anchor for the duck decoy, the apparatus comprising:

a motor;

a reel located on the duck decoy, said reel including a decoy cord and an anchor attached to an end of the decoy cord; and a T-shaped member disposed within a housing, said T-shaped member operatively connected to said motor and engaging said reel, wherein rotation of said motor causes rotation of said T-shaped member to automatically raise the anchor of the duck decoy.

6. The apparatus according to claim 5, wherein said T-shaped member operatively connected to an output shaft of said motor and rotatably mounted to a base of the housing.

7. The apparatus according to claim 5, wherein said motor comprises a bi-directional motor.

8. A device, in combination with a duck decoy, for automatically winding a decoy cord for the duck decoy, comprising:

a reel mounted to the duck decoy;

a housing removably attached to said reel;

a T-shaped member rotatably connected to said housing; and a motor operatively connected to said member, wherein rotation of said motor causes said member to engage said reel, thereby automatically winding the decoy cord of the duck decoy.

9. The device according to claim 8, wherein said motor comprises a bi-directional motor.

10. The device according to claim 8, where said housing is cylindrical in shape and comprises a base and side walls.

11. The device according to claim 10, wherein said member is rotatably connected to the base of said housing.

* * * * *